(12) United States Patent
Nakano

(10) Patent No.: US 7,010,515 B2
(45) Date of Patent: Mar. 7, 2006

(54) TEXT COMPARISON APPARATUS

(75) Inventor: Hiraku Nakano, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 615 days.

(21) Appl. No.: 10/193,624

(22) Filed: Jul. 12, 2002

(65) Prior Publication Data

US 2003/0028566 A1 Feb. 6, 2003

(30) Foreign Application Priority Data

Jul. 12, 2001 (JP) .............................. 2001-211632

(51) Int. Cl.
*G06F 17/30* (2006.01)
(52) U.S. Cl. .............................. 707/1; 707/2; 707/102; 707/104.1
(58) Field of Classification Search .................... 707/1, 707/2, 7, 102, 104.1
See application file for complete search history.

(56) References Cited

U.S. PATENT DOCUMENTS

| | | | | |
|---|---|---|---|---|
| 5,463,773 A | * | 10/1995 | Sakakibara et al. | ......... 707/102 |
| 5,832,470 A | * | 11/1998 | Morita et al. | ................... 707/1 |
| 5,857,179 A | * | 1/1999 | Vaithyanathan et al. | ....... 707/2 |
| 5,907,836 A | | 5/1999 | Sumita et al. | |
| 5,926,812 A | | 7/1999 | Hilsenrath et al. | |
| 6,026,388 A | | 2/2000 | Liddy et al. | |
| 6,128,613 A | * | 10/2000 | Wong et al. | .................... 707/7 |
| 6,137,911 A | * | 10/2000 | Zhilyaev | ..................... 382/225 |
| 6,154,737 A | | 11/2000 | Inaba et al. | |
| 6,173,251 B1 | | 1/2001 | Ito et al. | |
| 6,185,550 B1 | * | 2/2001 | Snow et al. | ................... 707/1 |
| 6,286,000 B1 | | 9/2001 | Apte et al. | |
| 6,397,215 B1 | * | 5/2002 | Kreulen et al. | ................ 707/7 |

FOREIGN PATENT DOCUMENTS

| | | |
|---|---|---|
| JP | 05-054037 | 3/1993 |
| JP | 09-218879 | 8/1997 |
| JP | 11-73422 A | 3/1999 |
| JP | 11-110395 | 4/1999 |
| JP | 2001-134599 A | 5/2001 |

* cited by examiner

Primary Examiner—Frantz Coby
(74) Attorney, Agent, or Firm—McDermott Will & Emery LLP

(57) ABSTRACT

A text comparison apparatus computes the occurrence count of text elements, stores those text elements that have an occurrence count of at least a occurrence count threshold for storage in a text element storage unit, uses those text elements that have an occurrence count of at least a occurrence count threshold for similarity calculation to calculate similarity, and calculates discrepancy for those text elements for which the difference of occurrence counts is at least a occurrence count threshold for discrepancy calculation. As a result, the calculation of the similarity and the discrepancy between two texts in the same or different languages can be determined

35 Claims, 17 Drawing Sheets

FIG. 2

| LANGUAGE | LETTERS TO BE REPLACED |
|---|---|
| JAPANESE | "(",")","-","0","1","2","3","4","5","6","7","8","9",",<br>"[","]","(",")",",",":","[","]","~","—",":",<br>"+","×","=","A","B","C","D","E","F","G","H",<br>"I","J","K","L","M","N","O","P","Q","R",<br>"S","T","U","V","W","X","Y","Z",<br>"c","d","e","f","g","h","i","j","k",<br>"m","n","o","p","q","r","s","t","u","v",<br>"w","x","y","z",<br>"け","こ","さ","し","す","せ","そ","た","ち","つ","て","と","な",<br>"に","ぬ","ね","の","は","ひ","ふ","へ","ほ","ま","み","む","め",<br>"も","や","ゆ","よ","ら","り","る","れ","ろ","わ","を","ん","あ",<br>"い","う","え","お","か","き","く","け","こ","さ","し","す","せ",<br>"ぞ","だ","ぢ","づ","で","ど","ば","び","ぶ","べ","ぼ","ぱ","ぴ",<br>"ぺ","ぽ","ぁ","ぃ","ぅ","ぇ","ぉ",<br>"図","手段","前記","発明","特許","請求項" |
| ENGLISH | ">","<",".",",",":",";","'",""","%","&","~",<br>"!","?","[","]","{","}","@","*","+","=","/","(",")","-" |

FIG. 3

```
┌BEFORE REPLACEMENT:─────────────────────────────────
│  『（５７）【要約】
│  【目的】 乗算器のハードウェア規模を低減しながら性能低下とならない開平演
│ 算装置を提供する。
│  【構成】 正規化手段７の出力する２ビット単位に正規化されたオペランドの上
│ 位をアドレスとしてテーブル情報格納手段８より平方根の近似逆数を索引し、０
│ 番目の部分剰余を正規化オペランドとして剰余保持手段１０の出力に乗算手段１
│ ２により掛けることで部分平方根を求め、各反復でのビット重複のない部分平方
│ 根を複数の部分平方根保持手段１４～２１に併合平方根として保持し、反転手段
│ ２１、被乗数生成手段２２及び（Ｒ＋Ｓ×Ｔ）演算手段２３により、反復計算の
│ 次ステップでの剰余を剰余から併合平方根と部分平方根の積を引くことにより求
│ める。』
└─────────────────────────────────────────────────
```

```
┌AFTER REPLACEMENT:──────────────────────────────────
│  『         要約
│   目的   乗算器  ハードウェア規模  低減        性能低下        開平演
│ 算装置 提供
│   構成   正規化      出力    ビット単位  正規化     オペランド  上
│ 位  アドレス      テーブル情報格納       平方根   近似逆数  索引
│ 番目  部分剰余  正規化オペランド      剰余保持         出力   乗算
│      掛       部分平方根   求    各反復   ビット重複      部分平方
│ 根  複数  部分平方根保持          併合平方根        保持    反転
│       被乗数生成      及            演算            反復計算
│ 次ステップ   剰余   剰余   併合平方根  部分平方根   積   引         求
│  』
└─────────────────────────────────────────────────
```

FIG. 4

| ITEM NUMBER | ITEM | UNCHARACTERISTIC TEXT ELEMENTS |
|---|---|---|
| 1 | ARTICLES | "a", "an", "the" |
| 2 | THE VERB "TO BE" | "be", "being", "been", "is", "was", "are", "am", "were" |
| 3 | THE VERB "TO DO" | "do", "does", "did", "doing", "done" |
| 4 | THE VERB "TO HAVE" | "have", "has", "having", "had" |
| 5 | PREPOSITIONS | "about", "above", "according", "across", "addition", "after", "against", "along", "among", "apart", "around", "as", "at", "back", "because", "before", "behind", "below", "beneath", "beside", "between", "beyond", "but", "by", "case", "concerning", "despite", "down", "during", "except", "excepting", "for", "from", "front", "in", "inside", "instead", "into", "like", "near", "of", "off", "on", "onto", "out", "outside", "over", "past", "place", "regarding", "round", "since", "through", "throughout", "till", "to", "top", "toward", "under", "underneath", "unlike", "until", "up", "upon", "with", "within", "without" |
| 6 | AUXILIARY VERBS | "can", "could", "must", "may", "might", "will", "would", "shall", "should", "ought", "used", "dare", "dared", "need" |

FIG. 5

| ITEM NUMBER | ITEM | UNCHARACTERISTIC TEXT ELEMENTS |
|---|---|---|
| 7 | CONJUNCTIONS | "and", "or", "but", "that", "if", "whether", "besides", "then", "else", "otherwise", "however", "still", "yet", "hence", "therefore", "so", "both", "either", "neither", "nor", "lest", "unless", "although", "though", "than" |
| 8 | INTERROGATIVES | "who", "whose", "whom", "which", "what", "when", "where", "why", "how" |
| 9 | PRONOUNS | "i", "my", "me", "mine", "myself", "we", "our", "us", "ours", "ourselves", "you", "your", "yours", "yourself", "yourselves", "he", "his", "him", "himself", "she", "her", "hers", "herself", "it", "its", "itself", "they", "their", "them", "theirs", "themselves", "this", "these", "those", "such", "same", "one", "some", "none", "all", "each", "other", "another", "others", "few", "any", "every", "somebody", "someone", "anybody", "anyone", "everything", "something", "anything", "nothing" |
| 10 | NUMERALS | "zero", "one", "two", "three", "four", "five", "six", "seven", "eight", "nine", "zeroth", "first", "second", "third", "fourth", "fifth", "sixth", "seventh", "eighth", "ninth", "ten", "eleven", "twelve", "thirteen", "fourteen", "fifteen", "sixteen", "seventeen", "eighteen", "nineteen", "tenth", "eleventh", "twelfth", "thirteenth", "fourteenth", "fifteenth", "sixteenth", "seventeenth", "eighteenth", "nineteenth" |

FIG. 6

| ITEM NUMBER | ITEM | UNCHARACTERISTIC TEXT ELEMENTS |
|---|---|---|
| 11 | UNCHARACTERISTIC WORDS FOR PATENT SPECIFICATIONS | "accordingly", "al", "allow", "allowing", "allows", "also", "apparatus", "apr", "art", "aug", "available", "b", "become", "becomes", "c", "claim", "claims", "comprise", "comprises", "comprising", "condition", "consequently", "consist", "consists", "control", "controlled", "controlling", "conventional", "d", "dec", "described", "description", "design", "designed", "desired", "device", "devices", "diagram", "drawings", "e", "embodiment", "enable", "et", "etc", "example", "f", "feb", "fig", "figs", "following", "found", "further", "g", "h", "hereinafter", "illustrated", "include", "included", "includes", "including", "indicate", "indicated", "indicates", "indicating", "invention", "inventions", "inventors", "i", "j", "jan", "jul", "jun", "k", "l", "less", "m", "made", "make", "makes", "making", "many", "mar", "means", "method", "more", "most", "much", "n", "needed", "needs", "new", "newly", "no", "non", "not", "nov", "now", "o", "oct", "only", "operable", "operate", "operated", "operates", "operating", "operation", "operations", "p", "patent", "preferably", "preferred", "present", "prior", "provide", "provided", "provides", "providing", "q", "r", "required", "requires", "requiring", "respectively", "result", "resultant", "s", "said", "sep", "set", "setting", "shown", "shows", "system", "systems", "t", "technique", "there", "thereby", "therein", "thereof", "thereto", "thus", "too", "u", "use", "user", "using", "utilize", "utilizes", "utilizing", "v", "very", "via", "w", "way", "whenever", "whereby", "wherein", "while", "x", "y", "z" |

FIG. 7

| ITEM NUMBER | ITEM | TEXT ELEMENT STORAGE FILE VOLUME (IN BYTES) | REDUCTION OF TEXT ELEMENT STORAGE FILE VOLUME | NUMBER OF TYPES OF TEXT ELEMENTS | REDUCTION OF NUMBER OF TYPES OF TEXT ELEMENTS | TOTAL NUMBER OF TEXT ELEMENTS | REDUCTION OF TOTAL NUMBER OF TEXT ELEMENTS |
|---|---|---|---|---|---|---|---|
| 0 | (BEFORE DELETION) | 162,783 | — | 16,443 | — | 187,293 | — |
| 1 | ARTICLES | 162,376 | 0.3% | 16,383 | 0.4% | 162,360 | 13.3% |
| 2 | THE VERB "TO BE" | 161,941 | 0.5% | 16,323 | 0.7% | 180,501 | 3.6% |
| 3 | THE VERB "TO DO" | 162,512 | 0.2% | 16,401 | 0.3% | 187,035 | 0.1% |
| 4 | THE VERB "TO HAVE" | 162,304 | 0.3% | 16,382 | 0.4% | 186,321 | 0.5% |
| 5 | PREPOSITIONS | 157,316 | 3.4% | 15,755 | 4.2% | 160,571 | 14.3% |
| 6 | AUXILIARY VERBS | 161,658 | 0.7% | 16,293 | 0.9% | 185,241 | 1.1% |
| 7 | CONJUNCTIONS | 160,328 | 1.5% | 16,141 | 1.8% | 178,293 | 4.8% |
| 8 | INTERROGATIVES | 162,112 | 0.4% | 16,357 | 0.5% | 185,664 | 0.9% |
| 9 | PRONOUNS | 160,257 | 1.6% | 16,102 | 2.1% | 182,414 | 2.6% |
| 10 | NUMERALS | 161,454 | 0.8% | 16,276 | 1.0% | 184,251 | 1.6% |
| 11 | UNCHARACTERISTIC WORDS FOR PATENT SPECIFICATIONS | 145,107 | 10.9% | 14,416 | 12.3% | 166,370 | 11.0% |
| ALL OF 1 – 10 DELETED | | 147,470 | 9.4% | 14,465 | 12.0% | 108,034 | 42.3% |
| ALL OF 1 – 11 DELETED | | 129,735 | 20.3% | 12,445 | 24.3% | 87,417 | 53.3% |

FIG. 8

| ITEM NUMBER | ITEM | TEXT ELEMENT STORAGE FILE VOLUME (IN BYTES) | REDUCTION OF TEXT ELEMENT STORAGE FILE VOLUME | NUMBER OF TYPES OF TEXT ELEMENTS | REDUCTION OF NUMBER OF TYPES OF TEXT ELEMENTS | TOTAL NUMBER OF TEXT ELEMENTS | REDUCTION OF TOTAL NUMBER OF TEXT ELEMENTS |
|---|---|---|---|---|---|---|---|
| 0 | (BEFORE DELETION) | 162,783 | — | 16,443 | — | 187,293 | — |
| 1 | ONE OR LESS OCCURRENCES DELETED | 93,600 | 42.5% | 9,656 | 41.3% | 180,486 | 3.6% |
| 2 | TWO OR LESS OCCURRENCES DELETED | 68,567 | 57.9% | 7,144 | 56.6% | 175,502 | 6.3% |
| 3 | THREE OR LESS OCCURRENCES DELETED | 55,533 | 65.9% | 5,813 | 64.6% | 171,509 | 8.4% |
| 4 | FOUR OR LESS OCCURRENCES DELETED | 46,852 | 71.2% | 4,911 | 70.1% | 167,901 | 10.4% |
| 5 | FIVE OR LESS OCCURRENCES DELETED | 41,487 | 74.5% | 4,344 | 73.6% | 165,066 | 11.9% |
| 6 | SIX OR LESS OCCURRENCES DELETED | 37,411 | 77.0% | 3,912 | 76.2% | 162,474 | 13.3% |
| 7 | SEVEN OR LESS OCCURRENCES DELETED | 33,732 | 79.3% | 3,521 | 78.6% | 159,737 | 14.7% |
| 8 | EIGHT OR LESS OCCURRENCES DELETED | 30,675 | 81.2% | 3,204 | 80.5% | 157,201 | 16.1% |
| 9 | NINE OR LESS OCCURRENCES DELETED | 28,286 | 82.6% | 2,952 | 82.0% | 154,933 | 17.3% |
| 10 | TEN OR LESS OCCURRENCES DELETED | 25,991 | 84.0% | 2,725 | 83.4% | 152,663 | 18.5% |

FIG. 9

| RANK | TEXT ELEMENT | OCCUR-RENCES | RANK | TEXT ELEMENT | OCCUR-RENCES | RANK | TEXT ELEMENT | OCCUR-RENCES | RANK | TEXT ELEMENT | OCCUR-RENCES |
|---|---|---|---|---|---|---|---|---|---|---|---|
| 1 | 出力 | 2036 | 2 | 演算 | 534 | 3 | マルチプレクサ | 516 | 4 | ビット | 426 |
| 5 | 剰余保持 | 355 | 6 | 部分平方根保持 | 330 | 7 | 選択 | 315 | 8 | 反転 | 306 |
| 9 | セット | 272 | 10 | 部分平方根 | 234 | 11 | 入力 | 219 | 12 | 被乗数生成 | 218 |
| 13 | 左 | 198 | 14 | 乗算 | 198 | 15 | ビットシフト | 189 | 16 | 番目 | 161 |
| 17 | 行 | 152 | 18 | テーブル情報格納 | 146 | 19 | 補正前部分平方根保持 | 146 | 20 | シフタ | 144 |
| 21 | 付加 | 144 | 22 | 最下位ビット | 136 | 23 | 乗数 | 128 | 24 | 平方根 | 127 |
| 25 | 回目 | 122 | 26 | 実行 | 120 | 27 | 求 | 119 | 28 | 積 | 119 |
| 29 | データ | 118 | 30 | 場合 | 98 | 31 | 部分平方根算出用加算 | 97 | 32 | 定数減算 | 96 |
| 33 | 正規化 | 95 | 34 | 一方 | 86 | 35 | 符号 | 83 | 36 | テーブル出力情報保持 | 82 |
| 37 | 実質的 | 82 | 38 | 込 | 80 | 39 | 埋 | 80 | 40 | 上位 | 79 |
| 41 | 対 | 77 | 42 | 示 | 76 | 43 | 入力レジスタ | 73 | 44 | DF | 70 |
| 45 | 被乗数 | 68 | 46 | 剰余R | 66 | 47 | 剰余 | 64 | 48 | シフト | 62 |
| 49 | 指数保持 | 62 | 50 | 実施例 | 61 | 51 | 例外検出情報保持 | 60 | 52 | 反復計算 | 59 |

FIG. 10

| RANK | TEXT ELEMENT | OCCUR-RENCES | RANK | TEXT ELEMENT | OCCUR-RENCES | RANK | TEXT ELEMENT | OCCUR-RENCES | RANK | TEXT ELEMENT | OCCUR-RENCES |
|---|---|---|---|---|---|---|---|---|---|---|---|
| 1 | computer | 239 | 2 | conduit | 130 | 3 | handheld | 119 | 4 | program | 119 |
| 5 | library | 103 | 6 | sub | 92 | 7 | database | 71 | 8 | information | 64 |
| 9 | synchronization | 63 | 10 | file | 62 | 11 | link | 60 | 12 | personal | 60 |
| 13 | sync | 56 | 14 | manager | 53 | 15 | application | 37 | 16 | communication | 35 |
| 17 | byte | 33 | 18 | hotsync | 32 | 19 | data | 31 | 20 | record | 31 |
| 21 | memory | 29 | 22 | libraries | 27 | 23 | long | 27 | 24 | pc | 27 |
| 25 | claimed | 25 | 26 | open | 25 | 27 | id | 24 | 28 | structure | 24 |
| 29 | parameters | 23 | 30 | communications | 22 | 31 | functions | 22 | 32 | transfer | 22 |
| 33 | databases | 21 | 34 | resident | 20 | 35 | step | 20 | 36 | caller | 19 |
| 37 | records | 19 | 38 | registry | 19 | 39 | code | 18 | 40 | int | 18 |
| 41 | illustrates | 17 | 42 | pbytes | 17 | 43 | dword | 16 | 44 | applications | 15 |
| 45 | ignore | 15 | 46 | process | 15 | 47 | filled | 15 | 48 | hh | 14 |
| 49 | reference | 14 | 50 | class | 13 | 51 | different | 13 | 52 | function | 13 |

FIG. 11

| DELETED PORTIONS | ANY TWO TEXTS OF 6,000,000-6,000,019 | | | | 6,000,000-6,000,019 VS. 6,000,067 | | | | | |
|---|---|---|---|---|---|---|---|---|---|---|
| | 6,000,011 VS. 6,000,012 | | ANY OTHER COMBINATION | | SIMILARITY OF 6,000,067 WITH RESPECT TO THE 20 PATENTS | | | SIMILARITY OF THE 20 PATENTS WITH RESPECT TO 6,000,067 | | |
| | MAXIMUM | MINIMUM | MAXIMUM | MINIMUM | MAXIMUM | MINIMUM | | MAXIMUM | MINIMUM | |
| NO DELETIONS | 99.9% | 99.4% | 89.2% | 51.3% | 54.4% | 41.0% | | 69.9% | 50.2% | |
| TEXT ELEMENTS WITH TWO OR LESS OCCURRENCES DELETED | 99.9% | 98.9% | 90.1% | 47.7% | 52.3% | 40.2% | | 64.4% | 44.4% | |
| 1 TO 10 IN FIGS. 4 TO 6 DELETED | 99.8% | 99.0% | 83.0% | 25.9% | 31.1% | 14.5% | | 49.0% | 22.9% | |
| 1 TO 11 IN FIGS. 4 TO 6 DELETED | 99.8% | 99.2% | 80.5% | 12.6% | 20.8% | 4.3% | | 41.4% | 10.4% | |
| TEXT ELEMENTS WITH TWO OR LESS OCCURRENCES AND 1 TO 10 IN FIGS. 4 TO 6 DELETED | 99.9% | 98.2% | 79.4% | 8.3% | 11.6% | 1.7% | | 30.4% | 2.4% | |
| TEXT ELEMENTS WITH TWO OR LESS OCCURRENCES AND 1 TO 11 IN FIGS. 4 TO 6 DELETED | 99.9% | 98.5% | 79.3% | 6.3% | 10.3% | 0.7% | | 30.9% | 1.4% | |

FIG. 12

| RANK | TEXT ELEMENT | DIFF. | OCCUR-RENCES IN A | OCCUR-RENCES IN B | RANK | TEXT ELEMENT | DIFF. | OCCUR-RENCES IN A | OCCUR-RENCES IN B | RANK | TEXT ELEMENT | DIFF. | OCCUR-RENCES IN A | OCCUR-RENCES IN B |
|---|---|---|---|---|---|---|---|---|---|---|---|---|---|---|
| 1 | command | 284 | 953 | 669 | 2 | buffer | 108 | 336 | 228 | 3 | data | 85 | 248 | 163 |
| 4 | storing | 45 | 60 | 15 | 5 | directory | 43 | 231 | 188 | 6 | associated | 37 | 84 | 47 |
| 7 | Commands | 36 | 127 | 91 | 8 | unused | 36 | 52 | 16 | 9 | information | 35 | 84 | 49 |
| 10 | Received | 33 | 62 | 29 | 11 | sink | 32 | 59 | 27 | 12 | portion | 29 | 33 | 4 |
| 13 | source | 27 | 46 | 19 | 14 | status | 27 | 69 | 42 | 15 | least | 25 | 36 | 11 |
| 16 | plurality | 24 | 35 | 11 | 17 | cache | 20 | 383 | 363 | 18 | entry | 20 | 103 | 83 |
| 19 | receiving | 18 | 23 | 5 | 20 | step | 18 | 40 | 22 | 21 | corresponding | 17 | 53 | 36 |
| 22 | entries | 17 | 56 | 39 | 23 | route | 17 | 68 | 51 | 24 | logic | 16 | 324 | 308 |
| 25 | allocated | 15 | 15 | 0 | 26 | allocating | 15 | 15 | 0 | 27 | acceptor | 14 | 73 | 59 |
| 28 | freely | 14 | 17 | 3 | 29 | handling | 14 | 27 | 13 | 30 | sinks | 14 | 18 | 4 |

FIG. 13

| RANK | TEXT ELEMENT | DIFF. | OCCUR-RENCES IN A | OCCUR-RENCES IN B | RANK | TEXT ELEMENT | DIFF. | OCCUR-RENCES IN A | OCCUR-RENCES IN B | RANK | TEXT ELEMENT | DIFF. | OCCUR-RENCES IN A | OCCUR-RENCES IN B |
|---|---|---|---|---|---|---|---|---|---|---|---|---|---|---|
| 1 | priority | 11 | 153 | 164 | | | | | | | | | | |

FIG. 15

| ITEM NUMBER | ITEM | UNCHARACTERISTIC PARTS OF SPEECH OR WORDS |
|---|---|---|
| 1 | PART OF SPEECH | NUMERALS, PRONOUNS, PARTICIPAL ADJECTIVES, ADVERBS, CONJUNCTIONS, AUXILIARY VERBS, PARTICLES |
| 2 | WORDS THAT ARE UNCHARACTERISTIC FOR PATENT SPECIFICATIONS | "こと" (koto), "等" (nado), "図" (zu), "発明" (hatsumei), "もの" (mono), "例" (rei), "第" (dai), "とき" (toki), "場合" (baai), "上記" (jouki), "前記" (zenki), "手段" (shudan), "請求項" (seikyuukou) |
| 3 | SPECIAL VERBS | "する" (suru) AND CONJUGATIONS OF "する" (suru) |

FIG. 16

| RANK | WORD | PART OF SPEECH | OCCUR-RENCES | RANK | WORD | PART OF SPEECH | OCCUR-RENCES | RANK | WORD | PART OF SPEECH | OCCUR-RENCES |
|---|---|---|---|---|---|---|---|---|---|---|---|
| 1 | 命令 | NOUN | 760 | 2 | 実行 | NOUN | 373 | 3 | する | VERB | 342 |
| 4 | ユニット | NOUN | 294 | 5 | 故障 | NOUN | 285 | 6 | さ | VERB | 215 |
| 7 | VLIW | UNCLASSI-FIED | 208 | 8 | プロセッサ | NOUN | 191 | 9 | 信号 | NOUN | 150 |
| 10 | 出力 | NOUN | 149 | 11 | 数 | NOUN | 149 | 12 | し | VERB | 138 |
| 13 | 動作 | NOUN | 109 | 14 | レジスタ | NOUN | 104 | 15 | 個 | NOUN | 101 |
| 16 | 長 | NOUN | 89 | 17 | 記載 | NOUN | 85 | 18 | 語 | NOUN | 85 |
| 19 | 制御 | NOUN | 84 | 20 | 初期 | NOUN | 80 | 21 | 要素 | NOUN | 74 |
| 22 | 検出 | NOUN | 72 | 23 | ステージ | NOUN | 67 | 24 | 特徴 | NOUN | 62 |
| 25 | 選択 | NOUN | 57 | 26 | 可能 | NOUN | 55 | 27 | 格納 | NOUN | 54 |
| 28 | 入力 | NOUN | 52 | 29 | シフト | NOUN | 50 | 30 | 障害 | NOUN | 48 |

FIG. 17

|     | (1)   | (2)   | (3)   | (4)   | (5)   | (6)   | (7)   | (8)   |
|-----|-------|-------|-------|-------|-------|-------|-------|-------|
| (1) |       | 89.9% | 42.6% | 46.9% | 89.2% | 81.1% | 29.6% | 38.2% |
| (2) | 80.1% |       | 45.8% | 48.1% | 77.0% | 84.0% | 34.3% | 36.9% |
| (3) | 52.7% | 42.2% |       | 89.7% | 42.5% | 45.3% | 86.4% | 78.4% |
| (4) | 48.8% | 45.1% | 72.0% |       | 48.5% | 40.1% | 57.3% | 86.0% |
| (5) | 84.0% | 81.0% | 31.2% | 34.7% |       | 72.7% | 33.5% | 36.3% |
| (6) | 64.4% | 74.2% | 39.5% | 34.8% | 64.8% |       | 32.4% | 35.8% |
| (7) | 44.7% | 34.1% | 89.2% | 76.7% | 49.7% | 43.8% |       | 83.9% |
| (8) | 46.9% | 35.8% | 62.0% | 88.3% | 44.7% | 38.4% | 58.2% |       |

FIG. 18

|     | (1)   | (2)   | (3)   | (4)   | (5)   | (6)   | (7)   | (8)   |
|-----|-------|-------|-------|-------|-------|-------|-------|-------|
| (1) |       | 62.0% | 85.6% | 81.4% | 16.8% | 72.4% | 83.8% | 80.1% |
| (2) | 26.3% |       | 70.0% | 65.8% | 30.0% | 41.0% | 79.7% | 74.4% |
| (3) | 75.1% | 74.0% |       | 35.7% | 78.7% | 81.3% | 30.6% | 52.7% |
| (4) | 67.7% | 69.2% | 39.0% |       | 65.7% | 74.6% | 53.9% | 29.1% |
| (5) | 35.2% | 70.6% | 87.8% | 83.7% |       | 72.9% | 86.4% | 84.3% |
| (6) | 38.1% | 24.3% | 68.5% | 63.2% | 26.9% |       | 60.7% | 59.6% |
| (7) | 68.9% | 71.8% | 6.8%  | 32.2% | 67.7% | 66.2% |       | 36.4% |
| (8) | 63.0% | 69.3% | 42.4% | 11.5% | 60.5% | 64.9% | 42.5% |       |

TEXT COMPARISON APPARATUS

BACKGROUND OF THE INVENTION

The present invention relates to a text comparison apparatus for calculating the similarity and the discrepancy between a plurality of texts, such as patent documents for example.

Conventionally, the similarity between two documents is calculated by using keywords entered by a user. On the other hand, JP H11-73422A (title: "Similar document retrieval system and storage medium used for same") is an example of a system calculating the similarity of two texts without keywords given by a user. This system has an internal index, and when a text is entered, words are extracted from the entered text to update the index. Information about the frequency of the words registered in the index is held in the index, and setting the significance of the word with the highest frequency to "1," the significance of general words is defined by the proportion to words with a large frequency. The similarity of two texts is calculated using the significance of the n words with the highest significance from the text serving as the reference in the comparison, wherein n is an integer that can be specified by the system parameters when calculating similarity. In the similarity calculation, the significances of the n words in the text serving as the reference in the comparison are summed up in the denominator, and the smaller significance value of each of the n words for the two texts is selected and the total thereof taken as the numerator.

In accordance with this conventional system, if the word with the highest significance is a word that does not convey any characteristics to the text comparison and that is used extremely often, then the significance value of the other n−1 words decreases, and the similarity may be judged to be low. Furthermore, this conventional system is not adapted to multiple languages.

SUMMARY OF THE INVENTION

It is an object of the present invention, when comparing two texts, to allow a calculation of similarity and discrepancy in which there are clear differences in accordance with the content of the texts.

It is another object of the present invention to present a text comparison apparatus that can be applied to the comparison of texts in different languages.

To attain these objects in accordance with the present invention, elements (this includes not only single words, but also portions of words and pluralities of concatenated words) are extracted from the texts, then the occurrence count of each of these text elements is determined, the text elements and their occurrence counts are stored as sets in a text element storage unit, the similarity of the texts is calculated by dividing the sum of all the occurrence counts of the text elements included in both of the two texts by the sum of the occurrence counts of all text elements in each of the texts, and the discrepancy is calculated by summing up the differences between the occurrence counts of text elements included in the two texts while assigning them to the text containing more of those text elements, and dividing this sum by the sum of the occurrence counts of all text elements in each of the texts. However, since a conspicuous difference in similarity and discrepancy may not appear regardless of how different the content is, an uncharacteristic text element storage unit is provided, which stores words that do not affect the similarity and discrepancy of texts, and that are not used for the calculation of similarity or discrepancy. Moreover, it may occur that text elements with low occurrence counts are used in both texts and keep the similarity high even though the content of the two texts is different, so that the text comparison apparatus may be further provided with a storage unit storing occurrence count threshold settings for similarity calculation, wherein text elements having an occurrence count that is less than the occurrence count threshold for similarity calculation are not used for the similarity calculation. Also, it may occur that when text elements are used two or three times more often in one text than in the other, this may increase the discrepancy regardless of the content of the texts, so that the text comparison apparatus may be further provided with a storage unit storing occurrence count threshold settings for discrepancy calculation, wherein text elements having an occurrence count that is less than the occurrence count threshold for discrepancy calculation are not used for the discrepancy calculation. Furthermore, in order to reduce the aspect that a large number of storage elements and occurrence counts have to be stored, the text comparison apparatus may be further provided with a storage unit storing the occurrence count threshold settings for storage, and text elements having a low occurrence count are not stored.

Consequently, in accordance with the present invention, regardless of the content of the text, removing uncharacteristic text elements imparting a large similarity on texts whose contents are not similar as well as text elements with low occurrence counts from the calculation of similarity and discrepancy, the difference between similarities and discrepancies of similar and dissimilar texts becomes large, and the precision of the text comparison apparatus can be improved. Furthermore, especially with discrepancy, it is possible to express by a numerical value to what extent two texts are different from one another, and if the two texts are not similar, not only is the similarity low, but this can be corroborated by a large discrepancy, and it becomes possible to estimate depending on the discrepancy whether the two texts are substantially the same, or whether one of them is more detailed, or includes different content. Consequently, with the text comparison apparatus of the present invention, the effect can be attained that in patent document searches, differences in the skill of the searchers can be evened out.

Furthermore, in the present invention, when comparing texts in different languages, nouns and verbs are processed, verbs are converted into corresponding nouns, so that ultimately the similarity and discrepancy are calculated based on the nouns. Consequently, the present invention presents a text comparison apparatus that can also be applied to the comparison of texts in different languages.

BRIEF DESCRIPTION OF THE DRAWINGS

FIG. 2 is a diagram illustrating an example of characters which are replaced with spaces in the text element extraction unit in FIG. 1.

FIG. 3 is a diagram showing an example of an extraction result with the text element extraction unit in FIG. 1.

FIG. 4 is a diagram showing an example of the storage content in the uncharacteristic text element storage unit in FIG. 1.

FIG. 5 is a diagram continuing from FIG. 4.

FIG. 6 is a diagram continuing from FIG. 5.

FIG. 7 is a diagram illustrating the result of the deletion of the uncharacteristic text elements in FIGS. 4 to 6.

FIG. 8 is a diagram showing the result of providing the storage unit storing the occurrence count threshold settings for storage in FIG. 1.

FIG. 9 is a diagram illustrating an example of the storage content in the text element storage unit in FIG. 1 for a given Japanese patent document.

FIG. 10 is a diagram illustrating an example of the storage content in the text element storage unit in FIG. 1 for a given English-language patent document.

FIG. 11 is a diagram illustrating an example of the similarity calculation with the text comparison apparatus in FIG. 1 for English-language patent documents.

FIG. 12 is a diagram showing a list of the text elements used for the calculation of discrepancy between two given English-language patent documents A and B with the text comparison apparatus in FIG. 1. FIG. 12 shows the text elements whose occurrence counts are larger in Document A.

FIG. 13 shows the list of those text elements whose occurrence counts are larger in the other Document B.

FIG. 15 is a diagram showing the words that are removed from the scope of comparison with the Japanese word analysis unit and the Japanese uncharacteristic word storage unit in FIG. 14.

FIG. 16 is a diagram showing an example of the processing results with the Japanese word analysis unit and the Japanese word counting unit in FIG. 14.

FIG. 17 is a diagram illustrating an example of the similarity calculation with the text comparison apparatus in FIG. 14 for Japanese and English patent documents.

FIG. 18 is a diagram illustrating an example of the discrepancy calculation with the text comparison apparatus in FIG. 14 for Japanese and English patent documents.

DETAILED DESCRIPTION OF THE INVENTION

The following is an explanation of preferred embodiments of the present invention with reference to the drawings. Here, an example relating to the comparison of patent documents is explained.

Figure 1:
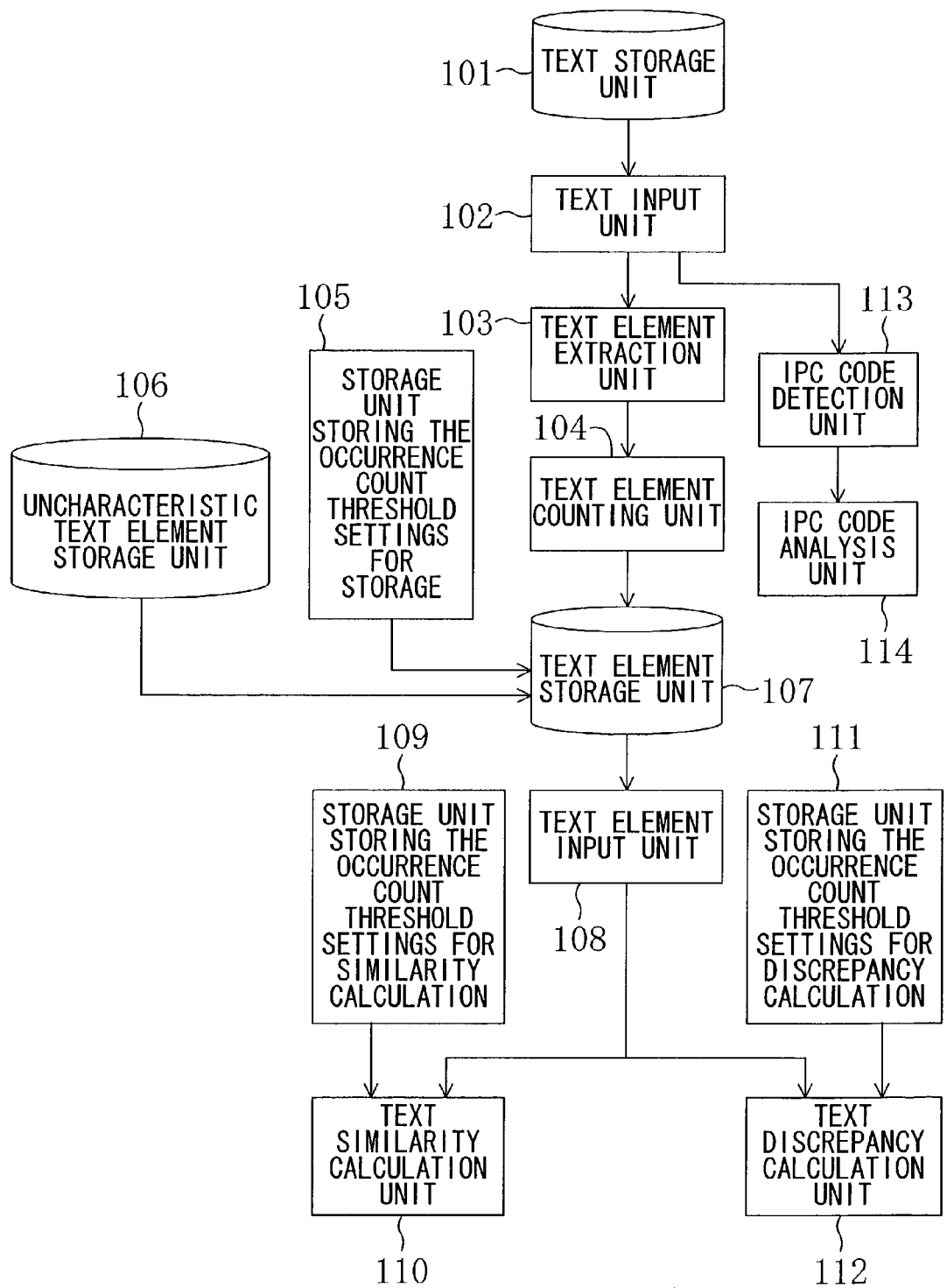
FIG. 1 is a block diagram showing the configuration of a text comparison apparatus in accordance with a first embodiment of the present invention.

FIG. 1 is a block drawing illustrating the configuration of a first embodiment of the present invention. In FIG. 1, numeral 101 denotes a text storage unit for storing a plurality of texts, numeral 102 denotes a text input unit, numeral 103 denotes a text element extraction unit for the extraction of structural elements from a text, numeral 104 denotes a text element counting unit for counting the occurrence count of each text element, numeral 105 denotes a storage unit storing the occurrence count threshold settings for storage, which gives the occurrence count threshold at which storage is carried out, when storing the text structural elements and the occurrence count as sets, numeral 106 denotes a unit storing uncharacteristic text elements that are used regardless of the content of the text and which are not characteristic for the content of the text, numeral 107 denotes a text element storage unit for storing text elements and their occurrence counts as sets, numeral 108 denotes a text element input unit for reading out text elements and their occurrence counts as sets, numeral 109 denotes a storage unit storing the occurrence count threshold settings for similarity calculation, which gives the occurrence count threshold of the text elements for which the similarity is calculated, numeral 110 is a text similarity calculation unit for calculating the similarity of two texts from the structural elements of the two texts and their occurrence counts, numeral 111 denotes a storage unit storing the occurrence count threshold settings for discrepancy calculation, which gives the occurrence count threshold of the text elements with which the discrepancy is calculated, numeral 112 denotes a text discrepancy calculation unit for calculating the discrepancy between two texts from the from the structural elements of the two texts and their occurrence counts, numeral 113 denotes a unit for detecting an IPC (international patent classification) code, and numeral 114 denotes an IPC code analysis unit.

When a new text is being stored from the outside in the text storage unit 101, the text input unit 102 reads out the newly stored text and structural elements of the text are extracted with the text element extraction unit 103. The text elements are separated from one another not by using a word dictionary for the extraction of the text elements, but by replacing the characters shown in FIG. 2 with spaces. In FIG. 2, there is one space each before and behind the 52 Roman letters "A" to "z".

In Japanese, when using a command to the effect that the process is terminated when the first character to be replaced has been found in one scan, the text is scanned for a number of times that is equal to the number of characters in the text. Thus, if only one Roman letter is used, a space is inserted before and after the Roman letter, and also in this case, it is replaced by a space. Furthermore, for Japanese, almost all uncharacteristic text elements (which are explained below) are written in so-called hiragana characters, and different from English, replacing delimiter characters by spaces and detecting uncharacteristic text elements is done by similar processes, so that in this embodiment the six words ("図" (zu)—"請求項" (seikyuukou)) in FIG. 2, which are commonly used in patent specifications, are deleted at the text element extraction stage.

Taking the abstract of JP H06-178132A as an example, FIG. 3 shows how a Japanese text changes when replacing the characters in FIG. 2 with spaces.

The text after replacement with spaces shown in FIG. 3 contains various structures, such as single words, pluralities of concatenated words, and single Kanji characters. Thus, the expression "word" is avoided, and these structures are referred to as "text elements" instead.

After extracting the text elements, the occurrence count of each text element is counted with the text element counting unit 104. The threshold of the occurrence count at which storage is performed is set in the storage unit 105 storing the occurrence count threshold settings for storage, and since the present embodiment also can handle English texts, text elements that are used regardless of the content of the text and which do not convey any characteristics regarding the content of the text, such as shown in FIGS. 4, 5 and 6, are stored in advance in the uncharacteristic text element storage unit 106.

FIG. 7 shows for the sum of the 20 patents from U.S. Pat. Nos. 6,000,000 to 6,000,019 how much the file volume of the text element storage unit 107, the number of types of text elements and the total number of text elements is reduced by deleting the uncharacteristic text elements listed in FIGS. 4, 5 and 6. Taking articles as an example, the fact that the number of types of text elements differs by 60 between item number 0 and item number 1 means that the three articles in FIG. 4 are used in all 20 patents, so that the number of types is reduced by 3×20=60. The reduction ratio in the number of types of text elements is only 0.4% whereas the reduction ratio in the total number of text elements is 13.3%, as articles are one of the most common types of words used in English-language patent documents. With the prepositions and prepositional phrases of item number 5, the reduction ratio of the number of types is about 10 times of that for articles, whereas the reduction ratio of the total number of text elements is about the same at 14.3%.

The text element storage unit 107 stores the text elements of the new text as sets of text elements and their occurrence counts when their number of occurrence is at or above a threshold of a certain occurrence count that is input from the storage unit 105 storing the occurrence count storage threshold settings for storage, and when the text elements are not stored in the uncharacteristic text element storage unit 106.

Regarding the occurrence count, FIG. 8 shows for the sum of the 20 patents from U.S. Pat. Nos. 6,000,000 to 6,000,019 how much the file volume of the text element storage unit 107, the number of types of text elements and the total number of text elements is reduced by deleting text elements occurring once to ten times or less.

FIG. 9 shows, for the case of the afore-mentioned patent publication JP H06-187132, an example of text elements and their occurrence counts stored in the text element storage unit 107, arranged in order and listed to the 52nd text element. It should be noted that for this publication, the number of types of text elements is 609 and the total number of text elements is 14,912.

Similarly, taking U.S. Pat. No. 6,000,000 as an example of an English language specification, the number of types of text elements in this patent is 265 and the total number of text elements is 3,232. FIG. 10 shows the text elements and their occurrence counts up to the 52nd text element.

When comparing two texts, the text element input unit 108 reads in, from the text element storage unit 107, sets of text elements of the two texts and their occurrence counts, and taking, as the subjects of the similarity calculation, those text elements that have an occurrence count that is at or above the occurrence count threshold set in the storage unit 109 storing the occurrence count threshold settings for similarity calculation, the text similarity calculation unit 110 calculates the similarity of the two texts by dividing the sum of the occurrence counts of the text elements included in both texts by the sum of the occurrence counts of all text elements in each of the texts.

To illustrate this by a formula, let EA(1), EA(2), . . . , EA(m) be the text elements of text A, and let SA be the set consisting of these text elements. The number of the text elements included in text A is expressed as NA(EA(i)) (with $1 \leq i \leq m$). On the other hand, let EB(1), EB(2), . . . , EB(n) be the text elements of text B, and let SB be the set consisting of these text elements. The number of the text elements included in text B is expressed as NB(EB(j)) (with $1 \leq j \leq n$). The similarity of A to B is given by Formula 1, and the similarity of B to A is given by Formula 2. In these formulas, text elements having an occurrence count that is below the occurrence count threshold for similarity calculations are used neither in the denominator nor in the numerator of the computation of Formula 1 and Formula 2.

$$\frac{\sum_{EA(i) \in SB} NA(EA(i))}{\sum_{i=1}^{m} NA(EA(i))} \times 100(\%) \quad \text{Formula 1}$$

$$\frac{\sum_{EB(j) \in SA} NB(EB(j))}{\sum_{j=1}^{n} NB(EB(j))} \times 100(\%) \quad \text{Formula 2}$$

FIG. 11 illustrates a example of the similarity calculation. When calculating the mutual similarity of the 20 patents from U.S. Pat. Nos. 6,000,000 to 6,000,019, the similarity between U.S. Pat. Nos. 6,000,011 and 6,000,012 is close to 100%, so that FIG. 11 shows the maximum and the minimum for all other combinations. In order to determine the effect of the deletion of uncharacteristic text elements and the deletion of text elements with low occurrence count, the similarity was determined for those various cases of deletion as shown in FIG. 11. When none of the text elements is deleted, the similarity is roughly 50% even when the content is not alike, which is due to the influence of commonly used words in English texts, and using these figures cannot be said to be appropriate. When deleting all of the uncharacteristic text elements shown in FIG. 4 to FIG. 6, and deleting the text elements with an occurrence count of 2 or less, the minimum similarity between two of the patents from U.S. Pat. Nos. 6,000,000 to 6,000,019 was 6.3%, the minimum similarity of U.S. Pat. No. 6,000,067 with respect to these 20 patents was 0.7%, the minimum similarity of the 20 patents with respect to U.S. Pat. No. 6,000,067 was 1.4%, which is much lower than without deletion, whereas the maximum value of the similarity among the U.S. Pat. Nos. 6,000,000 to 6,000,019 decreases only about 10%.

On the other hand, the text discrepancy calculation unit 112 in FIG. 1 calculates the discrepancy between the texts by summing up the differences between the occurrence counts of text elements included in the two texts for the text elements with a value of at least that given by the storage unit 111 storing the occurrence count threshold settings for discrepancy calculation while assigning them to the text containing more of the respective text elements, and dividing this sum by the sum of the occurrence counts of all text elements in each of the texts.

To illustrate this by a formula, let EA(1), EA(2), . . . , EA(m) be the text elements of text A, and let SA be the set consisting of these text elements. The number of text elements included in text A is expressed as NA(EA(i)) (with $1 \leq i \leq m$). On the other hand, let EB(1), EB(2), . . . , EB(n) be the text elements of text B, and let SB be the set consisting of these text elements. The number of text elements included in text B is expressed as NB(EB(j)) (with $1 \leq j \leq n$). The discrepancy of A to B is given by Formula 3, and the discrepancy of B to A is given by Formula 4, wherein TH is the occurrence count threshold for the discrepancy calculation. In these formulas, if the element EA(i) does not belong to the set SB, then NA(EA(i)) is taken to be zero, and if the element EB(j) does not belong to the set SA, then NB(EB(j)) is taken to be zero. That is to say, for text elements that are contained in one of the two texts but not in the other the occurrence count for the other text is taken to be zero.

$$\frac{\sum_{\{NA(EA(i))-NB(EA(i))\}\geq TH}\{NA(EA(i))-NB(EA(i))\}}{\sum_{i=1}^{m}NA(EA(i))}\times 100(\%) \quad \text{Formula 3}$$

$$\frac{\sum_{\{NB(EB(j))-NA(EB(j))\}\geq TH}\{NB(EB(j))-NA(EB(j))\}}{\sum_{j=1}^{n}NB(EB(j))}\times 100(\%) \quad \text{Formula 4}$$

Determining the discrepancy between U.S. Pat. Nos. 6,000,011 and 6,000,012 gives the following results:

discrepancy of U.S. Pat. No. 6,000,0011 to U.S. Pat. No. 6,000,012: 17.7% discrepancy of U.S. Pat. No. 6,000,0012 to U.S. Pat. No. 6,000,011: 0.2%

The discrepancy can be used as follows. First of all, when the similarity is low, it can be concluded that there is little common content in the two documents, and this can be substantiated by the fact that the discrepancy is large. Furthermore, when the similarity is large, it can be predicted that there are several passages in which the two documents have common contents, and when the discrepancy is substantially 0%, then it can be predicted that the content of the two documents is substantially the same.

If the similarity is close to 100% and the discrepancy is somewhat larger than 0%, then it can be predicted that one text contains passages that are more detailed and with a large number of words than the text it is being compared with, or that the text contains content that is not treated in the text it is being compared with. For example, the only text portions that differ between U.S. Pat. Nos. 6,000,011 and 6,000,012 are "RELATED APPLICATION DATA," "BACKGROUND OF THE INVENTION 1. Field of the Invention," and "claims," and other than that, the only difference is that the words "in the command buffer 600" have been added at the $6^{th}$ to $7^{th}$ line from the bottom on page 11 in U.S. Pat. No. 6,000,011. In U.S. Pat. No. 6,000,011, there are 33 claims on about 4 pages, and in U.S. Pat. No. 6,000,012, there are 16 claims on about 1 page, and this difference among the claims is the reason for the discrepancies of 17.7% and 0.2%.

The text discrepancy calculation unit 112 in FIG. 1 includes the function to output text elements ordered by the size of the difference in occurrence counts, obtaining an output as shown in FIGS. 12 and 13. Here, TH has been set to 10. FIG. 12 shows the list of text elements for which the occurrence count is larger in U.S. Pat. No. 6,000,011 (Document A), and FIG. 13 shows the list of text elements for which the occurrence count is larger in U.S. Pat. No. 6,000,012 (Document B). For the various text elements, "diff." is the difference between the occurrence counts, "occurrence A" is the occurrence count for Document A, and "occurrence B" is the occurrence count for Document B.

The IPC code detection unit 113 detects the IPC code from the patent specification read in over the text input unit 102. The IPC code analysis unit 114 analyzes whether the IPC code of the two specifications that are being compared match. In the case of the U.S. Pat. Nos. 6,000,011 and 6,000,012 for example:

U.S. Pat. No. 6,000,011: G06F 13/14

U.S. Pat. No. 6,000,012: G06F 13/14

Thus, the analysis result is output that section, class, subclass and group match.

It should be noted that the text elements and occurrence counts to be stored in the text element storage unit 107 in FIG. 1 can also be included in the text of the text storage unit 101.

Figure 14:
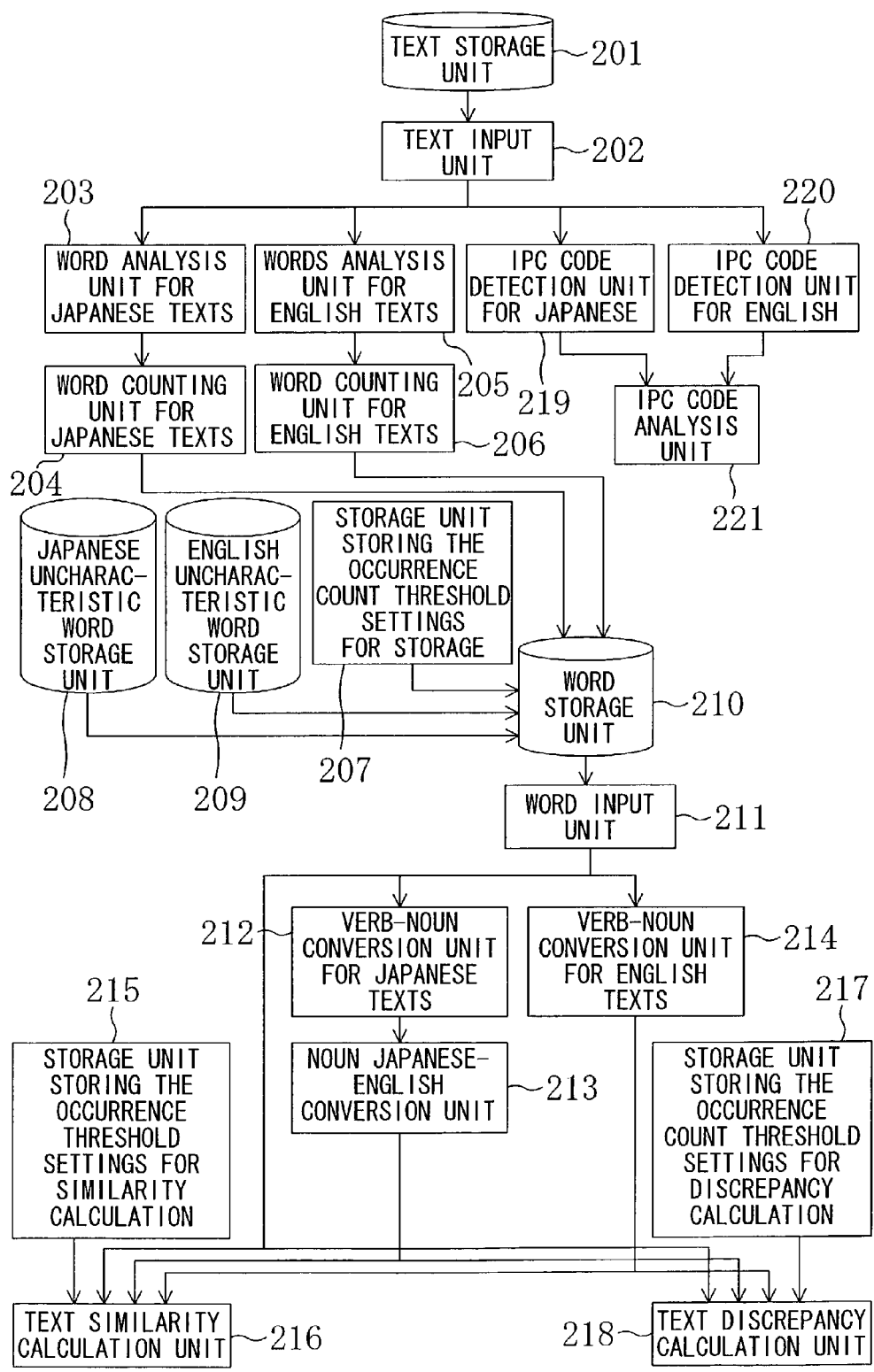
FIG. 14 is a block diagram showing the configuration of a text comparison apparatus in accordance with a second embodiment of the present invention.

FIG. 14 is a block diagram showing the configuration of a second embodiment of the present invention. In FIG. 14, numeral 201 denotes a text storage unit for storing a plurality of texts, numeral 202 denotes a text input unit, numeral 203 denotes a word analysis unit for Japanese texts, which analyses words and their part of speech in Japanese texts, numeral 204 denotes a word counting unit for Japanese texts, which counts how many times each word is included in the text, and for words having a plurality of part-of-speech data it does this for each of the part-of-speech data, numeral 205 is a words analysis unit for English texts which analyses words and their part of speech in English texts, numeral 206 denotes a word counting unit for English texts, which counts how many times each word is included in the text, and for words having a plurality of part-of-speech data, it does this for each of the part-of-speech data, numeral 207 is a storage unit storing the occurrence count threshold settings for storage, which gives the occurrence count threshold at which storage is performed when storing words, part-of-speech data and occurrence counts as sets, numeral 208 denotes a unit storing uncharacteristic words for Japanese texts, which are used regardless of the content of the text and which are not characteristic for the content of the text, numeral 209 denotes a unit storing uncharacteristic words for English texts, which are used regardless of the content of the text and which are not characteristic for the content of the text, numeral 210 denotes a word storage unit storing words, part-of-speech data and occurrence count as sets, numeral 211 denotes a word input unit reading out words, part-of-speech data and occurrence counts as sets, numeral 212 denotes a verb-noun conversion unit for Japanese, which processes only nouns and verbs, converts verbs into corresponding nouns, and correctively adds them to the occurrence count of the nouns, numeral 213 denotes a noun Japanese-English conversion unit, which converts words that are nouns from Japanese into English, numeral 214 denotes a verb-noun conversion unit for English, which processes only nouns and verbs, converts verbs into corresponding nouns, and correctively adds them to the occurrence count of the nouns, numeral 215 denotes a unit storing the occurrence threshold settings for similarity calculation, which gives the occurrence threshold of the words for which the similarity is to be calculated, numeral 216 is a text similarity calculation unit for calculating the similarity of two texts from the words of the two texts and their occurrence counts, numeral 217 denotes a storage unit storing the occurrence count threshold settings for discrepancy calculation, which gives the occurrence count threshold of the words for which the discrepancy is to be calculated, numeral 218 denotes a text discrepancy calculation unit for calculating the discrepancy between two texts from the words of the two texts and their occurrence counts, numeral 219 denotes an IPC code detection unit for Japanese, which detects the IPC (international patent classification) code from Japanese-language patent documents, numeral 220 denotes an IPC code detection unit for English, which detects the IPC code from English-language patent documents, and numeral 221 denotes an IPC code analysis unit.

When a new text is being stored from the outside in the text storage unit 201, the text input unit 202 reads out the newly stored text, and if it is a Japanese text, then words are extracted from the text with the Japanese text word analysis unit 203, and the occurrence count of the words, accompanied by part-of-speech data, is counted by the Japanese text word counting unit 204. On the other hand, if it is an English text, then words are extracted from the text with the English text word analysis unit 205, and the occurrence count of the words, accompanied by part-of-speech data, is counted by the English text word counting unit 206.

Examples of part-of-speech analysis systems for Japanese are:

Japanese Morphological Analysis System "ChaSen" by the Nara Institute of Science and Technology MSLR Parser Tool for Morphological and Syntactical Analysis by the Tokyo Institute of Technology Japanese Morphological Analysis System JUMAN by Kyoto University Morphological Analyzer "Sumomo" by NTT Basic Research Laboratories Examples of part-of-speech analysis systems for English are:

Trainable Part of Speech Tagger by John Hopkins University (U.S.)

MXPOST (Maximum Entropy POS Tagger) by Franklin University (U.S.)

CLAWS part-of-speech tagger by Lancaster University (U.K.)

TnT—Statistical Part-of-Speech Tagging by Saarland University (Germany)

Different from the first embodiment, the occurrence count of words of the uncharacteristic parts of speech shown as item number 1 in FIG. 15 are not counted and output by the Japanese text word analysis unit 203. The occurrence count threshold at which storage is performed is set in the storage unit 207 for storing the occurrence count threshold settings for storage, and uncharacteristic words of patent specifications shown as item number 2 in FIG. 15 and special verbs shown as item number 3 are stored in the unit 208 storing uncharacteristic words for Japanese texts. The words and letters in FIGS. 4 to 6 are stored in the unit 208 storing uncharacteristic words for English texts.

The reason why "する" (suru) and conjugations of "する" (suru) in FIG. 15 are regarded as uncharacteristic words in Japanese texts is as follows. FIG. 16 shows the 30 words with the highest occurrence counts after the word analysis in the patent specification of JP H09-292994A without eliminating "する" (suru) and conjugations of "する" (suru). The third, sixth and twelfth item "する" (suru), "さ" (sa) and "し" (shi) are "する" (suru) and conjugations of "する" (suru), which have a very high occurrence count. The reason why the occurrence count is so high is because "する" (suru) is often used as a postfix to nouns, as in "命令する" (meirei-suru), "実行する" (jikkou suru), "故障する" (koshou-suru), and this is also the reason why in the present invention nouns and verbs are taken when dealing with different languages, and verbs are converted into corresponding nouns to ultimately calculate the similarity and discrepancy with the nouns. To give an example, the English word "execute" corresponds to "実行" (jikkou) + "する" (suru) in Japanese.

Now, the word storage unit 210 stores sets of words in the new text, part-of-speech data and occurrence counts, for those words whose occurrence counts are at or above the occurrence count threshold that is output from the storage unit 207 storing the occurrence count threshold settings for storage and that are not stored in the unit 208 storing uncharacteristic words for Japanese texts, or, in case of English texts, not stored in the unit 209 storing uncharacteristic words for English texts.

When comparing two texts, the word input unit 211 reads out sets of words of the two texts, part-of-speech data and occurrence counts from the word storage unit 210, for Japanese texts, the Japanese text verb-noun conversion unit 212 discards all words other than verbs, nouns or undefined parts of speech and converts verbs into nouns. Nouns are converted into English by the noun Japanese-English conversion unit 213, and the Roman letter words of unknown part of speech are given out unchanged. On the other hand, for English texts, the English text verb-noun conversion unit 214 discards all words other than verbs, nouns or undefined parts of speech and converts verbs into nouns.

Then, taking as the subjects of the similarity calculation those words that have an occurrence count that is at or above the occurrence count threshold set in the storage unit 215 storing the occurrence count threshold settings for similarity calculation, the text similarity calculation unit 216 calculates the similarity of the texts by dividing the sum of the occurrence counts of the words included in both texts by the sum of the occurrence counts of all words in each of texts. On the other hand, the text discrepancy calculation unit 218 calculates the discrepancy between the texts by summing up the differences between the occurrence counts of words included in the two texts for those words with a value of at least that given by the storage unit 217 storing the occurrence count threshold settings for discrepancy calculation while assigning them to the text containing more of those text elements, and dividing this sum by the sum of the occurrence counts of all text elements in each of the texts.

FIG. 17 shows a specific example of a similarity calculation, and FIG. 18 shows a specific example of a discrepancy calculation. The correspondence between the Japanese and U.S. patent publications is as follows:

(1) JP H05-313861A corresponds to (5) U.S. Pat. No. 5,278,782
(2) JP H07-160481A corresponds to (6) U.S. Pat. No. 5,537,345
(3) JP H09-167093A corresponds to (7) U.S. Pat. No. 5,774,737
(4) JP H09-292994A corresponds to (8) U.S. Pat. No. 6,021,511

For the calculation of the values in FIGS. 17 and 18, nouns and verbs are used only when the two documents are in different languages. It should be noted that the titles of the inventions of the documents (1), (2), (3) and (4) are:

(1) Square root extraction device
(2) Mathematical function processor using table information
(3) Variable word length VLIW instruction processor
(4) Processor Since the example of the mathematical function processor in (2) includes a square root extraction device, the similarity between (1) and (2) is high. Also, (4) includes a VLIW instruction processor as an example of a processor that can operate with a degenerate configuration in case of faults, so that the similarity between (3) and (4) is large.

As for the correspondence between Japanese and English-language patent documents, (1) corresponds to (5), (2) corresponds to (6), (3) corresponds to (7), and (4) corresponds to (8), and their similarity is large, but it does not exceed 90%, because Japanese words have been converted into English words in a 1-to-1 fashion. This can be improved by introducing a thesaurus that can be adapted to 1-to-N word conversions.

The IPC code detection unit 219 for Japanese in FIG. 14 detects the IPC code when the patent specification read in over the text input unit 202 is in Japanese, and the IPC code detection unit 220 for English detects the IPC code when the patent specification read in over the text input unit 202 is in English. The IPC code analysis unit 221 analyzes whether the IPC codes of the two specifications that are being compared match, and outputs the result.

It should be noted that the words and occurrence counts to be stored in the word storage unit 210 in FIG. 14 can also be included in the text of the text storage unit 201.

The invention may be embodied in other specific forms without departing from the spirit or essential characteristics thereof The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A text comparison apparatus, comprising:
   a text storage means for storing a plurality of texts;
   a text input means for inputting a text from the text storage means;
   a text element extraction means for extracting elements from the text obtained with the text input means;
   a text element counting means for counting how many of each of the text elements are included in the text;
   a text element storage means for storing text elements and occurrence counts as sets;
   a text element input means for inputting text elements and their occurrence counts with regard to two texts from the text element storage means; and
   a similarity calculation means for calculating a similarity of the texts by dividing the sum of the occurrence counts of the text elements included in both of the two texts by the sum of the occurrence counts of all text elements in each of the texts.

2. The text comparison apparatus according to claim 1, further comprising a storage means for storing occurrence count threshold settings for storage;
   wherein text elements having an occurrence count of at least the occurrence count threshold for storage given out by the storage means for storing occurrence count threshold settings for storage, as well as their occurrence counts, are stored in the text element storage means.

3. The text comparison apparatus according to claim 1, further comprising a storage means for storing occurrence count threshold settings for similarity calculation,
   wherein, when inputting text elements and occurrence counts from the text element input means and calculating similarity with the similarity calculation means, text elements having an occurrence count that is less than the occurrence count threshold for similarity calculation are not used for the similarity calculation.

4. The text comparison apparatus according to claim 1, further comprising an uncharacteristic text element storage means,
   wherein text elements and their occurrence counts are not stored in the text element storage means when the text elements are stored in the uncharacteristic text element storage means.

5. The text comparison apparatus according to claim 1, further comprising an uncharacteristic text element storage means,
   wherein text elements and their occurrence counts are not used for the similarity calculation with the similarity calculation means when the text elements are stored in the uncharacteristic text element storage means.

6. The text comparison apparatus according to claim 1, further comprising:
   a storage means for storing occurrence count threshold settings for discrepancy calculation, which gives an occurrence count threshold of text elements to be used when calculating the discrepancy of two texts; and
   a discrepancy calculation means for calculating the discrepancy of texts by summing up the differences between the occurrence counts of text elements included in the two texts for the text elements with a value of at least that given by the storage means for storing occurrence count threshold settings for discrepancy calculation while assigning the differences to the text containing more of the text elements, and dividing this sum by the sum of the occurrence counts of all text elements in each of the texts.

7. The text comparison apparatus according to claim 6, further comprising an uncharacteristic text element storage means,
   wherein text elements and their occurrence counts are not used for the calculation of discrepancy with the discrepancy calculation means when the text elements are stored in the uncharacteristic text element storage means.

8. The text comparison apparatus according to claim 1, wherein the two compared texts are patent specifications; and further comprising:
   a means for detecting an international patent classification (IPC) code from patent specifications that have been read out via the text input means; and
   an IPC code analysis means for detecting whether the two texts contain the same IPC code.

9. A text comparison apparatus, comprising:
   a text storage means for storing a plurality of texts;
   a text input means for inputting a text from the text storage means;
   a text element extraction means for extracting elements from the text obtained with the text input means;
   a text element counting means for counting how many of each of the text elements are included the text;
   a text element storage means for storing text elements and occurrence counts as sets;
   a text element input means for inputting text elements and their occurrence counts with regard to two texts from the text element storage means;
   a storage means for storing occurrence count threshold settings for discrepancy calculation, which gives an occurrence count threshold of text elements to be used when calculating the discrepancy of two texts; and
   a discrepancy calculation means for calculating the discrepancy of two texts by summing up the differences between the occurrence counts of text elements included in the two texts for the text elements with a value of at least that given by the storage means for storing occurrence count threshold settings for discrepancy calculation while assigning the differences to the text containing more of the text elements, and dividing this sum by the sum of the occurrence counts of all text elements in each of the texts.

10. The text comparison apparatus according to claim 9, further comprising a storage means for storing occurrence count threshold settings for storage;
    wherein text elements having an occurrence count of at least the occurrence count threshold for storage given out by the storage means for storing occurrence count threshold settings for storage, as well as their occurrence counts, are stored in the text element storage means.

11. The text comparison apparatus according to claim 9, further comprising an uncharacteristic text element storage means,
wherein text elements and their occurrence counts are not stored in the text element storage means when the text elements are stored in the uncharacteristic text element storage means.

12. The text comparison apparatus according to claim 9, further comprising an uncharacteristic text element storage means,
wherein text elements and their occurrence counts are not used for the calculation of discrepancy with the discrepancy calculation means when the text elements are stored in the uncharacteristic text element storage means.

13. The text comparison apparatus according to claim 9, wherein the two compared texts are patent specifications; and further comprising:
a means for detecting an international patent classification (IPC) code from patent specifications that have been read out via the text input means; and
an IPC code analysis means for detecting whether the two texts contain the same IPC code.

14. A text comparison apparatus, comprising:
a text storage means for storing a plurality of texts;
a text input means for inputting a text from the text storage means;
a word analysis means for analyzing words and their part of speech from the text obtained with the text input means;
a word counting means for counting how many of each of the respective words are included the text, the counting being carried out for each of the part-of-speech data in case of words that have a plurality of part-of-speech data;
a word storage means for storing words, part-of-speech data and occurrence counts as sets;
a word input means for inputting words, part-of-speech data and occurrence counts with regard to two texts from the word storage means; and
a similarity calculation means for calculating a similarity of the texts by dividing the sum of the occurrence counts of the words that are included in both of the two texts and have matching part-of-speech data by the sum of the occurrence counts of all words in each of the texts.

15. The text comparison apparatus according to claim 14, further comprising a storage means for storing occurrence count threshold settings for storage;
wherein words having an occurrence count of at least the occurrence count threshold for storage given out by the storage means for storing occurrence count threshold settings for storage, as well as their part-of-speech data and occurrence counts, are stored in the word storage means.

16. The text comparison apparatus according to claim 14; further comprising a storage means for storing occurrence count threshold settings for similarity calculation;
wherein, when inputting words and occurrence counts from the word input means and calculating similarity with the similarity calculation means, words having an occurrence count that is less than the occurrence count threshold for similarity calculation are not used for the similarity calculation.

17. The text comparison apparatus according to claim 14, further comprising an uncharacteristic word storage means,
wherein words and their occurrence counts are not stored in the word storage means when the words are stored in the uncharacteristic word storage means.

18. The text comparison apparatus according to claim 14, further comprising an uncharacteristic word storage means,
wherein words and their occurrence counts are not used for the similarity calculation with the similarity calculation means when the words are stored in the uncharacteristic word storage means.

19. The text comparison apparatus according to claim 14, wherein the two compared texts are patent specifications; and further comprising:
a means for detecting an international patent classification (IPC) code from patent specifications that have been read out via the text input means; and
an IPC code analysis means for detecting whether the two texts contain the same IPC code.

20. The text comparison apparatus according to claim 14, further comprising a means for converting nouns between different languages,
wherein, when the two compared texts are in different languages, based on the part-of-speech data associated with the words given out from the word storage means, parts of speech other than nouns and verbs are removed from the scope of the similarity calculation before calculating the similarity with the similarity calculation means; and
further comprising a verb-noun conversion means, which converts verbs into corresponding nouns, and increases the occurrence counts of the nouns accordingly, whereafter the words included in one text are converted into the language of the other text, and the similarity between said one text and said other test is calculated.

21. The text comparison apparatus according to claim 14, further comprising a verb-noun conversion means, which, only for nouns and verbs, converts verbs into corresponding nouns, and increases the occurrence counts of the nouns accordingly, whereafter they are stored in the word storage means.

22. The text comparison apparatus according to claim 21, further comprising a means for converting nouns between different languages;
wherein, when the two compared texts are in different languages, words included in one text given out from the word storage means are converted into the language of the other text before calculating the similarity with the similarity calculation means.

23. The text comparison apparatus according to claim 14, further comprising:
a storage means for storing occurrence count threshold settings for discrepancy calculation, which gives an occurrence count threshold of words to be used when calculating the discrepancy of two texts; and
a discrepancy calculation means for calculating the discrepancy of two texts by summing up the differences between the occurrence counts of words that are included in the two texts and that have matching part-of-speech data, for the words with a value of at least that given by the storage means for storing occurrence count threshold settings for discrepancy calculation while assigning the differences to the text containing more of the words, and dividing this sum by the sum of the occurrence counts of all words in each of the texts.

24. The text comparison apparatus according to claim 23, further comprising an uncharacteristic word storage means,
wherein words and their occurrence counts are not used in the discrepancy calculation with the discrepancy calculation means when the words are stored in the uncharacteristic word storage means.

25. The text comparison apparatus according to claim 23, further comprising a means for converting nouns between different languages, wherein, when the two compared texts are in different languages, based on the part-of-speech data associated with the words given out from the word storage means, parts of speech other than nouns and verbs are removed from the scope of the similarity calculation before calculating the similarity with the similarity calculation means; and
further comprising a verb-noun conversion means, which converts verbs into corresponding nouns, and increases the occurrence counts of the nouns accordingly, whereafter the words included in one text are converted into the language of the other text, and the similarity between said one text and said other test is calculated.

26. The text comparison apparatus according to claim 23, further comprising a verb-noun conversion means, which, only for nouns and verbs, converts verbs into corresponding nouns, and increases the occurrence counts of the nouns accordingly, whereafter they are stored in the word storage means.

27. The text comparison apparatus according to claim 26, further comprising a means for converting nouns between different languages;
wherein, when the two compared texts are in different languages, words included in one text given out from the word storage means are converted into the language of the other text before calculating the similarity with the similarity calculation means.

28. A text comparison apparatus, comprising:
a text storage means for storing a plurality of texts;
a text input means for inputting a text from the text storage means;
a word analysis means for analyzing words and their part of speech from the text obtained with the text input means;
a word counting means for counting how many of each of the respective words are included the text, the counting being carried out for each of the part-of-speech data in case of words that have a plurality of part-of-speech data;
a word storage means for storing words, part-of-speech data and occurrence counts as sets;
a word input means for inputting words, part-of-speech data and occurrence counts with regard to two texts from the word storage means;
a storage means for storing occurrence count threshold settings for discrepancy calculation, which gives an occurrence count threshold of words to be used when calculating the discrepancy of two texts; and
a discrepancy calculation means for calculating the discrepancy of two texts by summing up the differences between the occurrence counts of words that are included in the two texts and that have matching part-of-speech data, for the words with a value of at least that given by the storage means for storing occurrence count threshold settings for discrepancy calculation while assigning the differences to the text containing more of the words, and dividing this sum by the sum of the occurrence counts of all words in each of the texts.

29. The text comparison apparatus according to claim 28, further comprising a storage means for storing occurrence count threshold settings for storage;
wherein words having an occurrence count of at least the occurrence count threshold for storage given out by the storage means for storing occurrence count threshold settings for storage, as well as their part-of-speech data and occurrence counts, are stored in the word storage means.

30. The text comparison apparatus according to claim 28, further comprising an uncharacteristic word storage means,
wherein words and their occurrence counts are not stored in the word storage means when the words are stored in the uncharacteristic word storage means.

31. The text comparison apparatus according to claim 28, further comprising an uncharacteristic word storage means,
wherein words and their occurrence counts are not used for the discrepancy calculation with the discrepancy calculation means when the words are stored in the uncharacteristic word storage means.

32. The text comparison apparatus according to claim 28, wherein the two compared texts are patent specifications; and further comprising:
a means for detecting an international patent classification (IPC) code from patent specifications that have been read out via the text input means; and
an IPC code analysis means for detecting whether the two texts contain the same IPC code.

33. The text comparison apparatus according to claim 28, further comprising a means for converting nouns between different languages, wherein, when the two compared texts are in different languages, based on the part-of-speech data associated with the words given out from the word storage means, parts of speech other than nouns and verbs are removed from the scope of the discrepancy calculation before calculating the discrepancy with the discrepancy calculation means; and
further comprising a verb-noun conversion means, which converts verbs into corresponding nouns, and increases the occurrence counts of the nouns accordingly, whereafter the words included in one text are converted into the language of the other text, and the similarity between said one text and said other test is calculated.

34. The text comparison apparatus according to claim 28, further comprising a verb-noun conversion means, which, only for nouns and verbs, converts verbs into corresponding nouns, and increases the occurrence counts of the nouns accordingly, whereafter they are stored in the word storage means.

35. The text comparison apparatus according to claim 34, further comprising a means for converting nouns between different languages;
wherein, when the two compared texts are in different languages, words included in one text given out from the word storage means are converted into the language of the other text before calculating the discrepancy with the discrepancy calculation means.

* * * * *